(12) United States Patent
Pettersson

(10) Patent No.: US 11,914,027 B2
(45) Date of Patent: Feb. 27, 2024

(54) METHOD AND SYSTEM FOR IDENTIFYING HAZARD OBJECTS AROUND A VEHICLE

(71) Applicant: APTIV TECHNOLOGIES LIMITED, St. Michael (BB)

(72) Inventor: Adam Sven Rune Pettersson, Gothenburg (SE)

(73) Assignee: Aptiv Technologies Limited, St. Michael (BB)

( * ) Notice: Subject to any disclaimer, the term of this patent is extended or adjusted under 35 U.S.C. 154(b) by 126 days.

(21) Appl. No.: 16/901,223

(22) Filed: Jun. 15, 2020

(65) Prior Publication Data

US 2020/0408903 A1    Dec. 31, 2020

(30) Foreign Application Priority Data

Jun. 28, 2019 (EP) .................................... 19183256

(51) Int. Cl.
*G01S 13/931* (2020.01)
*G05D 1/02* (2020.01)
*G05D 1/00* (2006.01)

(52) U.S. Cl.
CPC .......... *G01S 13/931* (2013.01); *G05D 1/0257* (2013.01); *G01S 2013/93185* (2020.01); *G05D 2201/0213* (2013.01)

(58) Field of Classification Search
CPC ......... G01S 13/931; G01S 2013/93185; G01S 7/415; G01S 13/589; G05D 2201/0213; G05D 1/0257; B60W 30/09; B60W 30/0953; B60W 30/0956; B60W 30/08; B60W 2554/4023; B60W 2554/4026; B60W 2554/4029; G08G 1/166
See application file for complete search history.

(56) References Cited

U.S. PATENT DOCUMENTS

| | | | |
|---|---|---|---|
| 5,530,447 A * | 6/1996 | Henderson ............ | G01S 13/931 340/936 |
| 6,944,543 B2 * | 9/2005 | Prakah-Asante ...... | G08G 1/166 701/96 |
| 8,952,799 B2 * | 2/2015 | Irrgang ................. | G08G 1/168 340/436 |
| 9,372,262 B2 * | 6/2016 | Takaki ................. | G01S 17/931 |
| 2003/0060980 A1 | 3/2003 | Prakah-Asante et al. | |
| 2012/0262284 A1 * | 10/2012 | Irrgang ................. | B60W 50/14 340/435 |
| 2014/0139368 A1 | 5/2014 | Takaki | |
| 2021/0373146 A1 * | 12/2021 | Buddendick .......... | G01S 13/589 |

OTHER PUBLICATIONS

Extended European Search Report for Application No. EP 19 18 3256 dated Dec. 16, 2019.

* cited by examiner

*Primary Examiner* — Tarek Elarabi

(74) *Attorney, Agent, or Firm* — Harness, Dickey & Pierce, P.L.C.

(57) ABSTRACT

A computer-implemented method for identifying hazard objects around a vehicle includes several steps carried out by computer hardware components. The method includes detecting an object in an environment of the vehicle; determining an orientation parameter of the object, which represents a difference between an orientation of the object and an orientation of the vehicle; determining, on the basis of the orientation parameter, whether the object satisfies at least one hazard condition; and identifying the object as a hazard object if the at least one hazard condition is satisfied.

21 Claims, 5 Drawing Sheets

METHOD AND SYSTEM FOR IDENTIFYING HAZARD OBJECTS AROUND A VEHICLE

CROSS REFERENCE TO RELATED APPLICATION

This application claims priority to European Patent Application No. EP 19183256.7, filed on Jun. 28, 2019.

TECHNICAL FIELD

The present disclosure relates to a method and system for identifying hazard objects around a vehicle. Various functions of the vehicle may be activated based on one or more identified hazard objects, for example warning functions for the driver (e.g., forward collision warning, FCW) or automatic driving functions (e.g., automatic emergency braking, AEB).

BACKGROUND

Sensor technology is used in automotive applications to enable various comfort or security functions, such as collision warning and active collision avoidance measures (e.g. AEB). Different sensor technologies may be used separately or in conjunction, wherein possible sensor types include, as a non-exhaustive list of examples, radar sensors, light detection and ranging (lidar) sensors, imaging devices (e.g. video cameras), and/or ultrasonic sensors. Although the different sensor types are well capable to capture the vehicle's environment under various conditions it is a challenge to identify potential hazard objects from the sensor data in an efficient and reliable manner. In principle, with processing increasing amounts of sensor data a higher reliability may be obtained in identifying hazard objects, which are considered to be relevant for the desired safety functions. On the other hand, the processing of the data needs to be done in a very short amount of time, in particular real time, so that a safety or other control function, such as AEB, can still be effective for avoiding a collision. Therefore, processing huge amounts of sensor data with respect to different hazard conditions is usually not feasible with the data processing resources of standard vehicles. A further challenge is to minimize the risk of false activations of security functions. A false activation means that the activation is in fact not necessary and can thus potentially cause surprise or even accidents. For example, a false activation of an AEB function in a vehicle that driving with high velocity on a crowded high way should be avoided in view of potential accidents. Therefore, correctly identifying hazard objects is one important aspect for all functions, which are based on this information. This also includes partial or full autonomous driving functions.

Accordingly, there is a need to provide an improved method for identifying hazard objects around a vehicle.

SUMMARY

In one aspect, the present disclosure is directed at a computer-implemented method for identifying hazard objects around a vehicle. The method includes: detecting an object in an environment of the vehicle; determining an orientation parameter of the object, the orientation parameter representing a difference between an orientation of the object and an orientation of the vehicle; determining, on the basis of the orientation parameter, whether the object satisfies at least one hazard condition; and identifying the object as a hazard object if the at least one hazard condition is satisfied.

The term "orientation" means a direction or heading. When considering the orientation of a vehicle for example, the orientation can be defined with respect to a predefined axis of the vehicle or another predefined geometric element, which can be a coordinate system having a fixed spatial relation to the vehicle body. In a specific example, the orientation of a vehicle can be defined by the longitudinal axis of the vehicle, which may be an axis parallel to the longer portion of the vehicle body. The longitudinal axis can also be parallel to the direction of travel along a straight line while the steering element is in a neutral steering position. The longitudinal axis can have a direction that essentially points away outside from a windshield of the vehicle (i.e., the front panel). Alternatively, the orientation can be defined as a current direction of movement of the vehicle. The same type of definitions can also be applied to the orientation of the object.

The orientation parameter can be, for example, an angle and can indicate the angular displacement between the orientation of the vehicle and the orientation of the object. In one example, the orientation parameter represents the orientation of the object with respect to a vehicle coordinate system, wherein the vehicle coordinate system has a fixed spatial relation with the vehicle. In this way, the orientation parameter directly represents the difference of orientation between the vehicle and the object.

In general, the orientation parameter can be a numerical value, which represents the orientation difference between the vehicle and the object. As pointed out further above the orientation parameter can be expressed as an angle, but other expressions could also be adopted. For example, the orientation parameter can be expressed as a categorical variable having a limited number of categories, each of the categories being associated with one of a plurality of orientation differences. The categories can be expressed as numbers, as letters or other signs.

The orientation parameter is preferably a numerical value, wherein the magnitude represents the degree of difference of orientation. In particular, when the orientation parameter is zero, the orientations of the vehicle and the object are considered to be essentially the same, i.e. the vehicle and the object are aligned in parallel. When the vehicle and the object are oriented in opposite directions the orientation parameter has a maximum, which corresponds to an angle of 180 degree. However, other ways of expressing the orientation difference are possible and not limited to an angle.

It has been found that the orientation parameter works well for identifying hazard objects in an efficient and reliable manner. On aspect is that the orientation difference between the vehicle and the object represents a high amount of useful information in a compact way, i.e. in one variable. This is to say that the orientation parameter encodes not only a spatial relationship between the vehicle and the object but it also carries information about their current paths of movement. For example, if the orientation difference is 90 degree the paths of movement of the object and the vehicle are crossing at essentially the same angle. This does of course not necessarily mean that the vehicle and the object are colliding but the expected direction of movement is assumed to be very different.

The identification of hazard objects on the basis of the orientation parameter allows for an intuitive and compact definition of one or more hazard conditions. If more than one hazard condition is used different hazard scenarios can be considered. This allows for distinguishing between different hazard qualities or classes, so that safety functions can be selected in dependence of the hazard quality or class. For example, if the hazard quality is low, only a warning may be presented visually or acoustically to the driver, whereas when the hazard quality is high, an emergency braking function may be activated directly. In other words, different types of hazard objects can be considered, wherein different types of actions can be carried out in dependence of the type of hazard object.

It is understood that said at least one hazard condition may not be necessarily defined solely on the basis of the orientation parameter, although this can be done if desired. In one example, the at least one hazard condition can be defined solely on the basis of the orientation parameter, wherein further hazard conditions are considered only if said at least one hazard condition is satisfied. In this way, a step-wise approach can be adopted to increase the overall efficiency of processing. However, as another example, said at least one hazard condition can be defined by other parameters too, in addition to the orientation parameter.

From the above, it is also understood that the identification of a hazard object does not necessarily imply that a safety function of the vehicle is activated automatically, although this can be done if desired. In one example, the method can comprise activating at least one safety function for controlling the vehicle on the basis of one or more identified hazard objects. So in general, the identification of a hazard object qualifies the object as a potential hazard for the vehicle, which distinguishes them from other objects around the vehicle. As such, the method is configured to classify the detected objects around the vehicle into at least two groups, namely hazard objects and other objects. This includes that a detected object is not identified as a hazard object if the at least one hazard condition is not satisfied.

The at least one hazard condition can be defined by one or more logical or mathematical expressions. For example, the hazard condition can comprise one or more thresholds for distinguishing between hazard objects and other objects on the basis of the orientation parameter. More specific examples of hazard conditions will become apparent from the following.

An object around the vehicle and thus a potential hazard object can also be a vehicle itself. In this case, the object is a vehicle other than the ego or host vehicle to which the method refers (in general the term "vehicle" refers not to the object). However, an object can also be another member of traffic, e.g. a pedestrian or a cyclist. A vehicle can be for example, a car, a motor bike, a lorry or the like.

The detection of one or more objects can be carried out with a detection algorithm and on the basis of data representing an environment of the vehicle. The detection algorithm can generally be configured with respect to the type of data, which can be sensor data captured by one or more sensors mounted on the vehicle. The detection algorithm can depend on the underlying sensor technology of the sensors. Preferably, a radar-sensor system can be installed in the vehicle and the detection of objects is carried out on the basis of the radar-sensor data provided by the radar-sensor system. Then, an angle information, which is useful for determining the orientation parameter, is provided as part of radar detection points (radar detection points are part of typical radar-sensor data). In addition, reliable object-detection algorithms are known from the art at least for radar-sensor data. Therefore, when using a radar-sensor system, the orientation parameter can be determined with high efficiency and reliability. However, other sensor technologies can be used as an alternative or in addition to a radar system. The one or more sensors also do not need to be necessarily installed in the vehicle because the environment of the vehicle could in principle also be captured from outside the vehicle.

It is understood that at least some or all steps of the method can generally be associated with a common time instance. In particular, one or more objects and their orientations with respect to the vehicle can be determined for a first time instance, wherein one or more hazard conditions are checked for the first time instance. The process can be repeated for a second and third time instance in the same manner, and so forth. In other words, the method can be carried out periodically, so that the environment of the vehicle is monitored over time, wherein one or more function of the vehicle can be dynamically activated on the basis of detected hazard objects. Consecutive scans for detecting objects around the vehicle can be processed together in order to further enhance the reliability of the method, which also increases the security of the vehicle.

According to an embodiment, the at least one hazard condition specifies an orientation range for the orientation parameter. For example, if the orientation parameter is within the orientation range of the at least one hazard condition the respective hazard condition is considered to be satisfied, i.e. fulfilled. The range can be defined by two threshold values, which represent a lower and an upper limit with the range extending between or outside these limits. One single threshold value may also be sufficient to define a range, for example from a predefined value x to infinity. While the orientation range can cover all numerical values of the range it may alternatively be defined as a subset of values or other signs. It has been found that an orientation range is useful for defining the one or more hazard conditions in an effective manner. The orientation range can be interpreted as a group of different orientations, which essentially have the same relevance in view of hazard aspects.

According to another embodiment, the method includes determining at least one vehicle-motion parameter of the vehicle, wherein the at least one hazard condition specifies a vehicle-motion range for the at least one vehicle-motion parameter. The vehicle-motion parameter represents the motion of the vehicle. In particular, the at least one vehicle-motion parameter can comprise or represent a velocity of the vehicle and/or a steering parameter of the vehicle, wherein the steering parameter indicates a direction of steering, for example left versus right steering. The parameter, as is generally understood in view of the term "parameter", can be expressed, e.g., as a numerical value or as another sign, e.g., a letter.

The velocity of the vehicle can be provided by a device for determining the velocity, which may be installed in the vehicle. For example, the velocity can be provided by the vehicle's speedometer. As an alternative, the velocity can be provided via a network from a global positioning system (GPS) or another source.

The vehicle-motion range can be defined in terms of one or more thresholds, as discussed in general in connection with the orientation range. By defining the hazard condition in dependence of the vehicle's velocity the method can be made more reliable. It is understood that the vehicle-motion parameter is not the orientation parameter.

According to another embodiment, the method includes determining an object-motion parameter of the object other than the orientation parameter, wherein the at least one hazard condition specifies an object-motion range for the object-motion parameter. The object-motion parameter represents the motion of the object. In particular, the object-motion parameter comprises or represents a velocity of the object. This velocity can be expressed relative to the velocity of the vehicle, or it can be an over-the ground velocity.

The velocity of the object can be determined from the data captured by one or more sensors mounted on the vehicle, for example said radar system. The respective sensor data can be the same as for determining the orientation parameter. By considering the object velocity in addition to the orientation the reliability can be further increased. For example, if the orientation difference between the vehicle and the respective object is high, additional consideration of the object velocity can help to minimize false identifications of hazard objects.

In a further embodiment, the at least one hazard condition specifies a predetermined relation between the vehicle-motion parameter and the object-motion parameter. An example for a predefined relation is that the vehicle-motion parameter is lower than the object-motion parameter. The parameters can in both cases be given by a velocity value. Incorporating said relation into the hazard condition allows to further increase the reliability of the method.

According to an embodiment, the method makes use of a plurality of different hazard conditions. This means that in the step of determining whether the object satisfies at least one hazard condition, a plurality of hazard conditions, preferably three to seven, particularly preferably five hazard conditions are considered. This allows for a classification of objects with a satisfactory degree of differentiation between objects of different hazard relevancy.

The plurality of hazard conditions can comprise at least one pair of hazard conditions being axially symmetric with respect to a longitudinal axis of the vehicle. In particular, each member of the pair can have an orientation range, wherein both orientation ranges are axially symmetric. The longitudinal axis can be defined in the same manner as the orientation. It can be defined as an imaginary straight line, which is parallel to a longer stretch of its body. The symmetric definition of the hazard conditions makes the overall set of hazard conditions more compact, thus improving reliability and efficiency of the method.

According to an embodiment, the plurality of hazard conditions comprise (i) a first hazard condition specifying a first orientation range for the orientation parameter and (ii) at least one second hazard condition specifying a second orientation range for the orientation parameter; wherein the first orientation range is at least partially lower and/or smaller than the second orientation range. Preferably, the first orientation range covers lower orientation parameter values than the second range. The first orientation range can be centered around a zero value of the orientation parameter, which preferably indicates an orientation difference of zero. Also merely preferably, the first orientation range and the second orientation range do not overlap.

The first hazard condition can further specify a first vehicle-motion range for a first vehicle-motion parameter of the vehicle, wherein the second hazard condition further specifies a second vehicle-motion range for the first vehicle-motion parameter; wherein the first vehicle-motion range is at least partially higher and/or larger than the second vehicle-motion range. For example, the first vehicle-motion range covers higher parameter values than the second vehicle-motion range, for example up to 160 kilometers per hour (km/h). In contrast, the second vehicle motion range can cover values only up to, e.g. 60 km/h. The first and second vehicle-motion ranges can, however, be overlapping, wherein the first vehicle-motion range can be larger than the second vehicle-motion range. The first vehicle-motion parameter can be defined as explained in more general terms further above in connection with the vehicle-motion parameter. It can be, e.g., a velocity of the vehicle or a steering parameter.

The at least one second hazard condition can further specify a first object-motion range for a first object-motion parameter of the object, the first object-motion range being defined relative to the first vehicle-motion parameter. In particular, the first object-motion range can be dependent on the first vehicle-motion parameter. For example, the second hazard condition can specify that the object-motion parameter needs to be higher than the first vehicle-motion parameter in order to satisfy the second hazard condition, wherein one or more additional offsets can be incorporated for adjustments. The object-motion parameter can be defined as explained in more general terms further above in connection with the object-motion parameter. Preferably, both the first vehicle-motion parameter and the object-motion parameter represent a velocity.

According to an embodiment the plurality of hazard conditions comprise at least one third hazard condition specifying (i) a third orientation range for the orientation parameter and (ii) a third vehicle-motion range for the first vehicle-motion parameter; wherein the third orientation range is at least partially higher than the second orientation range and wherein the third vehicle-motion range is at least partially lower and/or smaller than the second vehicle-motion range. For example, an upper limit of the third vehicle-motion range can be lower than an upper limit of the second vehicle-motion range.

The third orientation range can be overlapping with the second orientation range but is preferably not overlapping with the first orientation range. In contrast, the third vehicle-motion range can be overlapping with the first and second vehicle-motion ranges, i.e. the third range can be a subset of the first and/or second range. As indicated above, an upper limit of the third vehicle-motion range is preferably below an upper limit of the second vehicle-motion range, i.e. the vehicle motion needs to be comparably small in order to allow the third hazard condition to become fulfilled with respect to vehicle motion. This further reduces the risk of a "wrong" identification of objects as hazard objects.

According to another embodiment, the third hazard condition can further specify a second vehicle-motion range for a second vehicle-motion parameter of the vehicle. This allows for a further improvement of the method in view of reliability. The second vehicle-motion parameter is preferably a steering parameter as discussed further above. In particular, the second vehicle-motion parameter can comprise two classes, one of the classes indicating a steering action of the driver in one direction (e.g. left) and the other one of the classes indicating a steering action of the driver in another direction (e.g. right).

According to an embodiment, the method includes the following if the object is identified as a hazard object in response to the at least one hazard condition being satisfied: determining whether at least one additional hazard condition associated with the at least one hazard condition is satisfied; and activating at least one safety function for controlling the vehicle if the at least one additional hazard condition is satisfied. This is a multi-step approach for activating one or more safety functions, e.g. AEB, wherein reliability (minimizing false activations) and efficiency (low processing complexity) of the method are further enhanced.

The plurality of hazard conditions can cover all possible values of the orientation parameter by means of one or more orientation ranges. In one example there can be a first hazard condition, two second hazard conditions, and two third hazard conditions, wherein the orientation ranges cover the full circle, i.e. 360 degree. In addition, the orientation ranges of the second and third hazard conditions can be defined pairwise, respectively, with each pair covering a sector of the orientation parameter with axial symmetry about an axis being parallel to a longitudinal axis of the vehicle. It is understood that axial symmetry can formally also be expressed with respect to another axis, which is not necessarily a longitudinal axis.

In another aspect, the present disclosure is directed at a computer system configured to carry out several or all steps of the computer-implemented method described herein.

In a further aspect, a computer system connectable or connected to a sensor is provided, the sensor being configured to capture an environment of a vehicle, and the computer system comprising a plurality of computer hardware components configured to carry out the computer-implemented method of at least one of the embodiments described herein on the basis of data captured by the sensor. The computer system and/or the sensor can be mounted on the vehicle. It is understood that more than one sensor or a sensor system can be used for capturing the environment, so that the robustness of the method is increased.

The computer system may include a plurality of computer hardware components (for example a processing unit, at least one memory unit and at least one non-transitory data storage). It will be understood that further computer hardware components may be provided and used for carrying out steps of the computer implemented method in the computer system. The non-transitory data storage and/or the memory unit may comprise a computer program for instructing the computer to perform several or all steps or aspects of the computer-implemented method described herein, for example using the processing unit and the at least one memory unit.

In another aspect, the present disclosure is directed at a non-transitory computer readable medium comprising instructions for carrying out several or all steps or aspects of the computer-implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer-implemented method described herein.

BRIEF DESCRIPTION OF THE DRAWINGS

Exemplary embodiments and functions of the present disclosure are described herein in conjunction with the following drawings, showing schematically.

DETAILED DESCRIPTION

Figure 1:
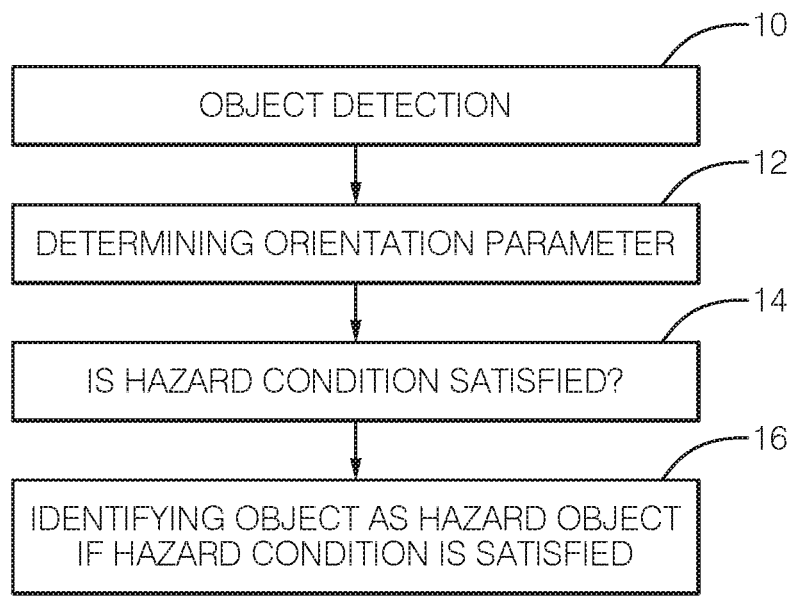
FIG. 1—a method for identifying hazard objects around a vehicle.

FIG. 1 depicts a computer-implemented method for identifying hazard objects around a vehicle, the method comprising: detecting an object in an environment of the vehicle (cf. step 10, "object detection"); determining an orientation parameter of the object (cf. step 12), the orientation parameter representing a difference between an orientation of the object and an orientation of the vehicle; determining, on the basis of the orientation parameter, whether the object satisfies at least one hazard condition (cf. step 14); and identifying the object as a hazard object if the at least one hazard condition is satisfied (cf. step 16). Each of the steps 10, 12, 14, 16 and further steps described above may be performed by computer hardware components.

The orientation parameter is preferably formed by an angle, wherein the angle represents said difference of orientations between the vehicle and the object. Per definition, a respective angle is within a potential range between −180 degree and +180 degree, i.e. [480, 180], which covers the full range of 360 degree. The angle extends within a plane that is considered to be parallel with the ground on which the vehicle and the potential objects are positioned. It is understood that the orientation parameter can be defined in other ways too, for example as an angle within a range of [0, 360], or expressed in radians or other another unit.

Figure 2:
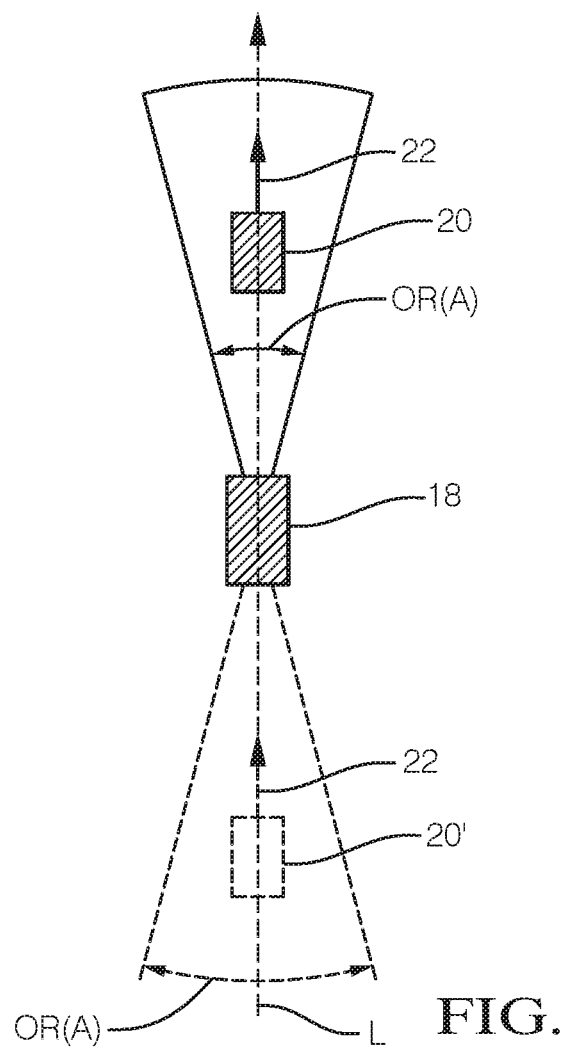
FIG. 2—a first orientation range for an orientation parameter of an object around a vehicle.
Figure 3:
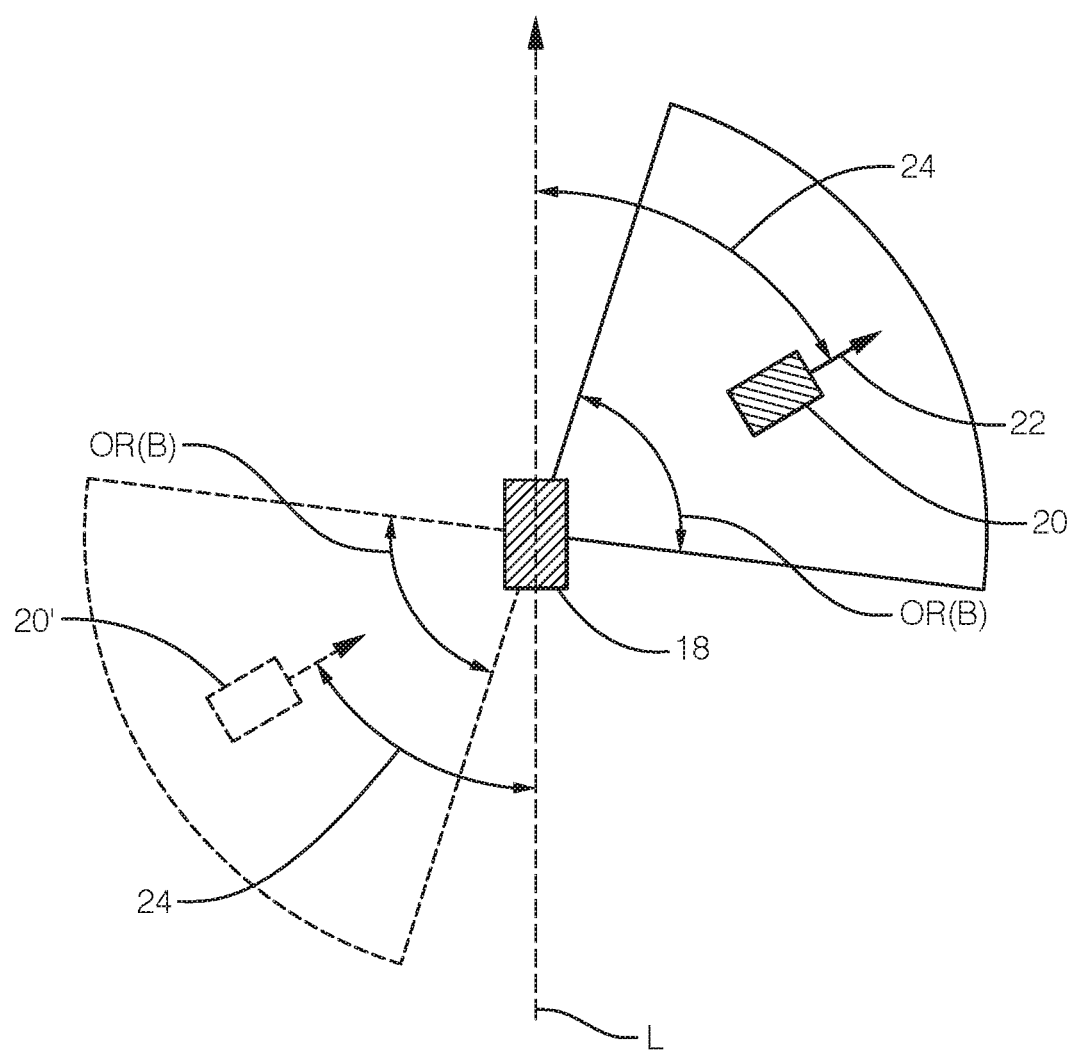
FIG. 3—a second orientation range for the orientation parameter.

The orientation parameter is illustrated in FIGS. 2 and 3 in conjunction with a vehicle 18 and an object 20. An arrowed dashed line L indicates the orientation of the vehicle 18 and an arrow 22 indicates the orientation of the object 20. The line L is a longitudinal axis of the vehicle 18 and additionally defines an axial symmetry of the body of the vehicle 18. In a normal driving situation the driver of the vehicle 18 typically looks through a windshield (not shown) of the vehicle 18 in the direction of arrowed line L. Likewise, the object 20 can be a vehicle or a similar object type, wherein the arrow 22 can be defined in the same way with respect to the object 20. This is illustrated in FIG. 2.

As can also be seen from FIG. 2, the orientation of the vehicle 18 and the orientation of the object 20 are the same because the arrowed line L and the direction of the arrow 22 are in parallel and pointing in the same direction. Therefore, the difference of orientations and thus the orientation parameter are zero. It is understood that in FIG. 2 the position of the object 20 relative to the vehicle 18 is merely an example. In particular, the vehicle 18 and the object 20 do not need to be positioned on the line L but can be arbitrarily displaced, while the orientation difference is still the same. In addition, the object 20 does not need to be in front of the vehicle 18 but can also be behind the vehicle 18, as indicated in dashed by object 20'.

An example of a non-zero orientation parameter is shown in FIG. 3. As can be seen, the angle 24 between the line L and the arrow 22 is non-zero. This also holds for the object 20', which is shown to better illustrate the nature of the orientation parameter.

A plurality of different hazard conditions are considered in step 14. In one example, five different hazard conditions A, B, C, D, E are considered, which are partially illustrated in FIGS. 2 to 6, respectively.

Hazard condition A specifies a first orientation range OR(A) for the orientation parameter, as indicated in FIG. 2, wherein the first orientation range OR(A) is between a lower threshold and an upper threshold. The first range OR(A) is between −10 and +10 degree and thus centered around zero, i.e. OR(A)=[−10,+10] degree, see FIG. 2. As can also be seen in FIG. 2 the first orientation range OR(A) not only "extends" in front of the vehicle 18 but also behind, as shown in dashed lines. This is to emphasize that orientation parameter does not carry information about where the object is placed relative to the vehicle. Such positional information can be considered in further hazard conditions, which are checked only if one or more of the hazard conditions A to E is satisfied.

Preferably, the hazard conditions A to E are defined so that a given detected object cannot satisfy more than one of the hazard conditions A to E at one time instance.

The first hazard condition A is satisfied with respect to the first orientation range OR(A) if the angular displacement, i.e. the angle 24 of the arrow 22 of the object 20 with respect to the line L is within the OR(A) regardless of other positional differences between the vehicle 18 and the object 20.

Hazard condition A further specifies a first vehicle-motion range VR(A) for the velocity of the vehicle 18. VR(A) covers a velocity range between zero and a first upper value, in particular [0, 160] km/h.

In view of hazard condition A, the object 20, 20' is identified as a hazard object if (i) the orientation parameter is within OR(A) and (ii) the velocity of the vehicle 18 is within VR(A). In FIG. 2, objects 20 and 20' both satisfy the hazard condition A with respect to their orientation parameters.

The second hazard condition B is illustrated in FIG. 3 as far as a second orientation range OR(B) is concerned. OR(B) is between a lower threshold and an upper threshold, which is [10, 105] degree as shown in FIG. 3. The range OR(B) is also shown in dashed lines with the object 20' on the opposite side of the vehicle 18.

The second hazard condition B further specifies a second vehicle-motion range VR(B) for the velocity of the vehicle 18. VR(B) covers a velocity range between zero and a second upper value, in particular [0, 60] km/h. Therefore VR(A) is partially higher and larger than VR(B).

The second hazard condition B further specifies a first object-motion range OMR(B) for the velocity of the object 20. In an example, the velocity of the object 20 is required to be greater than the velocity of the vehicle 18 minus an offset k, i.e. the second hazard condition specifies a predefined relation between the velocity of the vehicle 18 and the object 20 which can be expressed as V(vehicle)−k<V(object) or V(vehicle)<V(object)+k, wherein V( ) denotes velocity. The offset k can have a value in the range of 10 to 30 km/h, in particular 20 km/h. It is understood that that all velocities are preferably expressed in the same unit.

Figure 4:
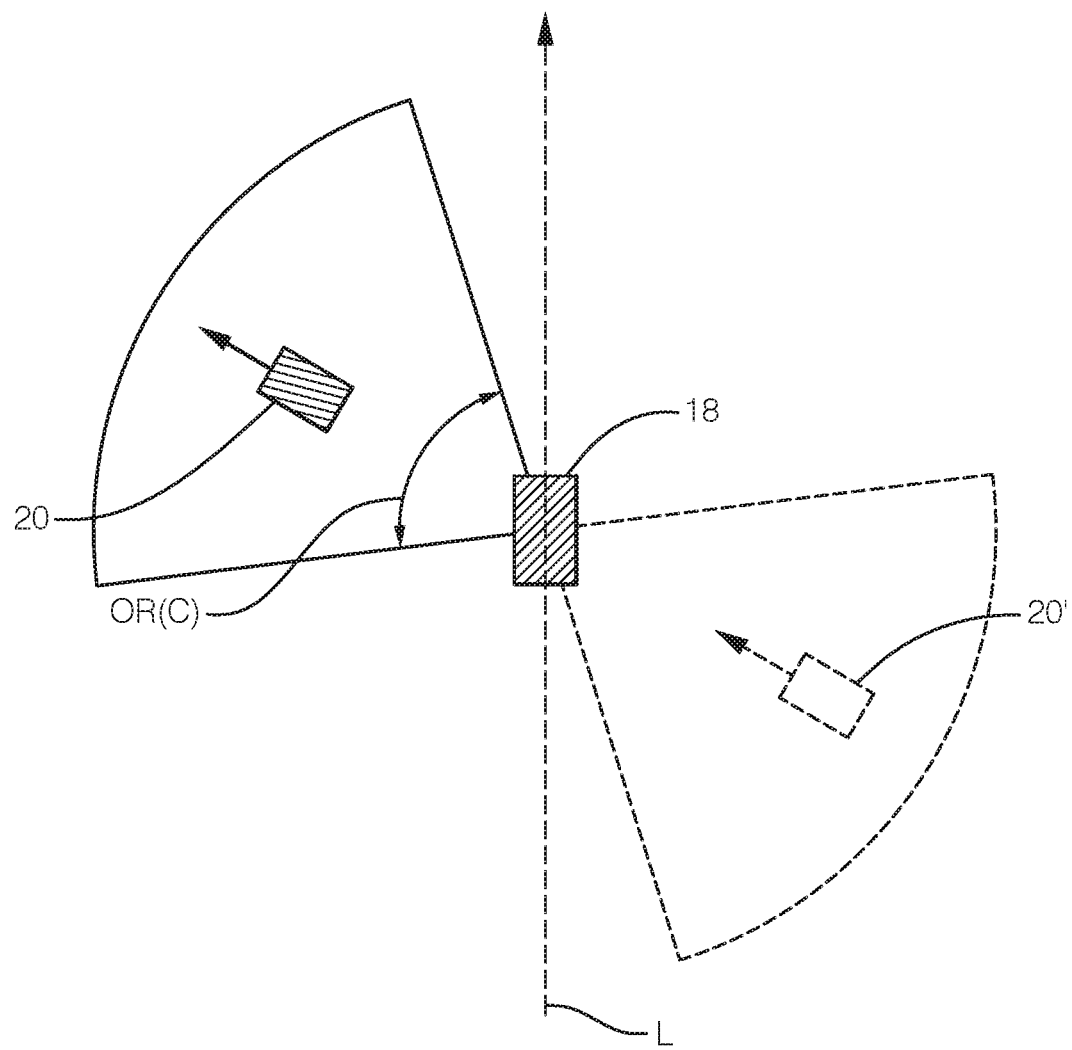
FIG. 4—a third orientation range for the orientation parameter.

The third hazard condition C is illustrated in FIG. 4 as far as a third orientation range OR(C) is concerned. OR(C) is between a lower threshold and an upper threshold, which is [−105, −10] degree as shown in FIG. 4. The range OR(C) is also shown in dashed lines with the object 20' on the opposite side of the vehicle 18.

The third hazard condition C further specifies a third vehicle-motion range VR(C) for the velocity of the vehicle 18, which is the same as for hazard condition B, i.e. VR(C)=VR(B), which is [0, 60] km/h.

The third hazard condition C further specifies a second object-motion range OMR(C) for the velocity of the object 20, which is the same as in condition B, i.e. OMR(C)=OMR(B).

It is understood that the second and third hazard conditions B and C form a pair of hazard conditions, which axially symmetric about the line L with respect to the orientation ranges OR(B) and OR(C).

Figure 5:
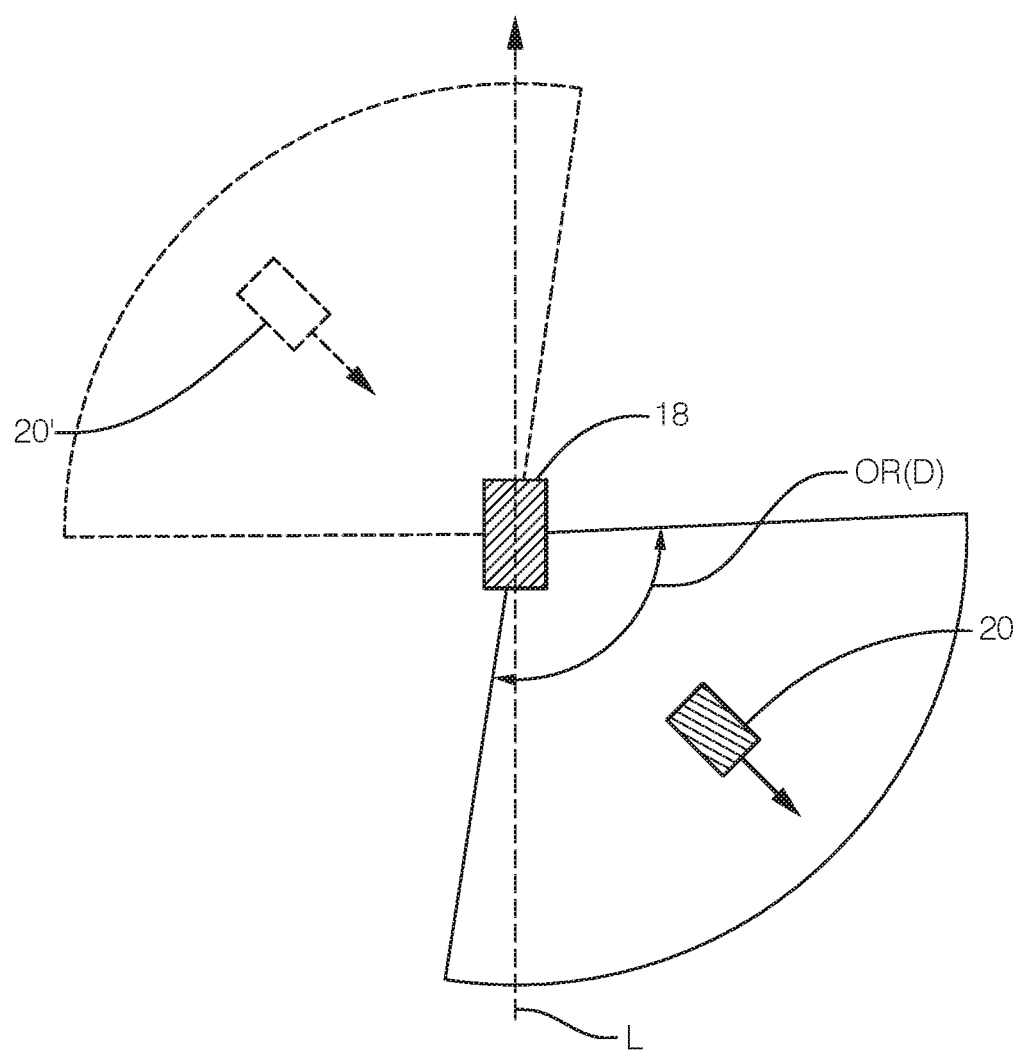
FIG. 5—a fourth orientation range for the orientation parameter.
Figure 6:
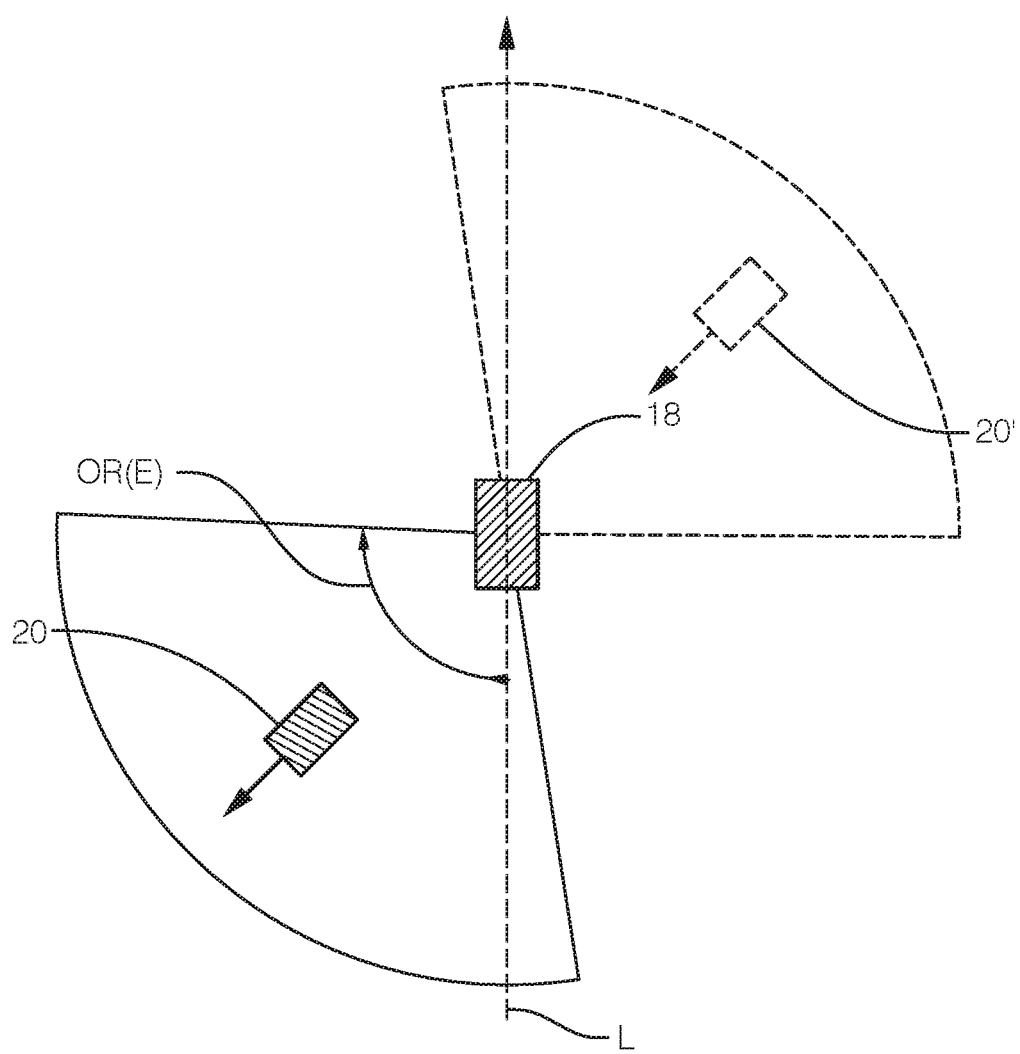
FIG. 6—a fifth orientation range for the orientation parameter.

In a similar fashion, fourth and fifth hazard conditions D and E form a pair of axially symmetric hazard conditions, which are illustrated in FIG. 5 and FIG. 6, respectively. A fourth orientation range OR(D) is shown in FIG. 5, which is [90, −175] degree. Likewise, a fifth orientation range OR(E) is shown in FIG. 6, which is [−90, 175] degree.

Beyond orientation range, the fourth and fifth hazard conditions both specify a vehicle-motion range, i.e. VR(D) and VR(E), which are the same and equal to [0, 30] km/h. VR(A) is thus partially higher and larger than VR(B), VR(C) and partially higher and larger than VR(D), VR(E). In addition, VR(B) and VR(C) are partially higher and larger than VR(D), VR(E).

It is understood that the hazard conditions A, B, C, D, E are merely examples and that other definitions are possible for obtaining at least similar results. Nevertheless the presented structure and values of the hazard have found to provide significant advantages in view reliability and efficiency for identifying hazard objects.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A computer-implemented method for identifying hazard objects around a vehicle, the method comprising:
   detecting, by at least one sensor, an object in an environment of the vehicle;
   determining, by at least one processing unit, an orientation parameter and a speed of the object based on data from the at least one sensor, the orientation parameter representing an angular difference between an orientation of the object and an orientation of the vehicle;
   determining whether the orientation parameter fits within a predefined orientation range of angular differences between the orientation of the object and the orientation of the vehicle, wherein the orientation range extends in front of and behind the vehicle;
   determining, with the at least one processing unit, whether a velocity of the vehicle is within a predetermined velocity range between 0 and a predetermined upper velocity value;
   determining whether a speed of the vehicle is less than a sum of the speed of the object plus a predetermined constant, wherein the predetermined constant being within a range from 10 km/hr to 30 km/hr;
   determining, on the basis that the orientation parameter fits within the predefined orientation range, the velocity of the vehicle is within the predetermined velocity range and the speed of the vehicle is less than the sum of the speed of the object plus the predetermined constant, whether the object satisfies at least one hazard condition;
   identifying the object as a hazard object if the at least one hazard condition is satisfied; and
   activating at least one automated function in response to identifying the object as a hazard.

2. The method of claim 1, comprising determining at least one vehicle-motion parameter of the vehicle, wherein the at least one hazard condition specifies a vehicle-motion range for the at least one vehicle-motion parameter, and wherein the at least one vehicle-motion parameter comprises a steering parameter of the vehicle, the steering parameter indicating a direction of steering.

3. The method of claim 2, wherein the at least one hazard condition specifies an object-motion range for the speed of the object, and the at least one hazard condition specifies a predetermined relation between the vehicle-motion parameter and the speed of the object.

4. The method of claim 1, comprising determining whether the speed of the object fits within an object-motion range.

5. The method of claim 1, wherein, determining whether the object satisfies at least one hazard condition includes considering at least three and up to seven hazard conditions.

6. The method of claim 5, wherein the at least three and up to seven hazard conditions comprise at least one pair of hazard conditions that are axially symmetric with respect to a longitudinal axis of the vehicle.

7. The method of claim 5, wherein the at least three and up to seven hazard conditions include a first hazard condition specifying a first orientation range for the orientation parameter and at least one second hazard condition specifying a second orientation range for the orientation parameter, and the first orientation range is at least partially lower and/or smaller than the second orientation range.

8. The method of claim 7, wherein the first hazard condition further specifies a first vehicle-motion range for a first vehicle-motion parameter of the vehicle, the at least one second hazard condition further specifies a second vehicle-motion range for the first vehicle-motion parameter, and the first vehicle-motion range is at least partially higher and/or larger than the second vehicle-motion range.

9. The method of claim 8, wherein the at least one second hazard condition further specifies a first object-motion range for a first object-motion parameter of the object, and the first object-motion range is defined relative to the first vehicle-motion parameter.

10. The method of claim 8, wherein the at least three and up to seven hazard conditions include at least one third hazard condition specifying a third orientation range for the orientation parameter and a third vehicle-motion range for the first vehicle-motion parameter, the third orientation range is at least partially higher than the second orientation range, and the third vehicle-motion range is at least partially lower and/or smaller than the second vehicle-motion range.

11. The method of claim 10, wherein the at least one third hazard condition further specifies a second vehicle-motion range for a second vehicle-motion parameter of the vehicle.

12. The method of claim 1, wherein if the object is identified as a hazard object in response to the at least one hazard condition being satisfied, the method comprises:

determining whether at least one additional hazard condition associated with the at least one hazard condition is satisfied; and the at least one automated function comprises at least one safety function for controlling the vehicle if the at least one additional hazard condition is satisfied.

13. A computer system connectable to the at least one sensor, the computer system comprising a plurality of computer hardware components configured to carry out the computer-implemented method of claim 1 based on the data from the at least one sensor.

14. A non-transitory computer readable medium comprising instructions for carrying out the computer-implemented method of claim 1.

15. The method of claim 1, wherein there are a plurality of predefined orientation ranges, and determining whether the orientation parameter fits within a predefined orientation range comprises determining which of the plurality of predefined orientation ranges the orientation parameter fits within.

16. The method of claim 15, wherein there are a plurality of hazard conditions respectively corresponding to the plurality of predefined orientation ranges, and determining whether the object satisfies the at least one hazard condition comprises identifying the one of the plurality of hazard conditions the object satisfies based on the one of the plurality of predefined orientation ranges the orientation parameter fits within.

17. The method of claim 15, wherein the plurality of predefined orientation ranges are distinct from each other and an orientation parameter that fits within one of the plurality of predefined orientation ranges cannot fit within another of the plurality of predefined orientation ranges.

18. The method of claim 1, wherein the predetermined constant is 20 km/hour.

19. A system for identifying hazard objects around a vehicle, the system comprising:

at least one sensor configured to detect an object in an environment of the vehicle; and at least one processing unit configured to:

determine an orientation parameter and a speed of the object based on data from the at least one sensor, the orientation parameter representing an angular difference between an orientation of the object and an orientation of the vehicle;

determine whether the orientation parameter fits within a predefined orientation range of angular differences between the orientation of the object and the orientation of the vehicle, wherein the orientation range extends in front of and behind the vehicle;

determining, with the at least one processing unit, whether a velocity of the vehicle is within a predetermined velocity range between 0 and a predetermined upper velocity value;

determine whether a speed of the vehicle is less than a sum of the speed of the object plus a predetermined constant, wherein the predetermined constant being within a range from 10 km/hr to 30 km/hr;

determine, on the basis that the orientation parameter fits within the predefined orientation range, the velocity of the vehicle is within the predetermined velocity range and the speed of the vehicle is less than the sum of the speed of the object plus the predetermined constant, whether the object satisfies at least one hazard condition;

identify the object as a hazard object if the at least one hazard condition is satisfied; and activate at least one automated function in response to identifying the object as a hazard.

20. A method comprising:
- detecting, with at least one sensor, an object in an environment of a vehicle;
- determining, with at least one processing unit, angular difference between an orientation of the object and an orientation of the vehicle based on data from the at least one sensor;
- determining, with the at least one processing unit, whether the angular difference is within a predetermined range of angular differences;
- determining, with the at least one processing unit, a speed of the object based on data from the at least one sensor;
- determining, with the at least one processing unit, whether a velocity of the vehicle is within a predetermined velocity range between 0 and a predetermined upper velocity value;
- determining, with the at least one processing unit, whether a speed of the vehicle is less than a sum of the speed of the object plus a predetermined constant, the predetermined constant being within a range from 10 km/hr to 30 km/hr;
- determining, with the at least one processing unit, that the object satisfies a hazard condition in response to determining that (i) the angular difference between the orientation of the object and the orientation of the vehicle is within the predetermined range of angular differences, (ii) the velocity of the vehicle is within the predetermined velocity range, and (iii) the speed of the vehicle is less than the sum of the speed of the object plus the predetermined constant; and
- activating, with the at least one processing unit, at least one automated function of the vehicle in response to determining that the object satisfies the hazard condition.

21. The method of claim 20, wherein:
- the predetermined range of angular differences is from at least one of 10 to 105 degrees or −105 to −10 degrees;
- the predetermined upper speed value is 60 km/hr; and
- the predetermined constant is 20 km/hr.

* * * * *